Sept. 8, 1970  A. L. MORSE ET AL  3,528,005
ULTRA-SENSITIVE MAGNETIC GRADIOMETER USING WEAKLY COUPLED
SUPERCONDUCTORS CONNECTED IN THE MANNER OF A FIGURE EIGHT
Filed Nov. 16, 1967  3 Sheets-Sheet 1

Arthur L. Morse
Darrell L. Judge
INVENTORS

BY
Donald C. Keaveney
ATTORNEY

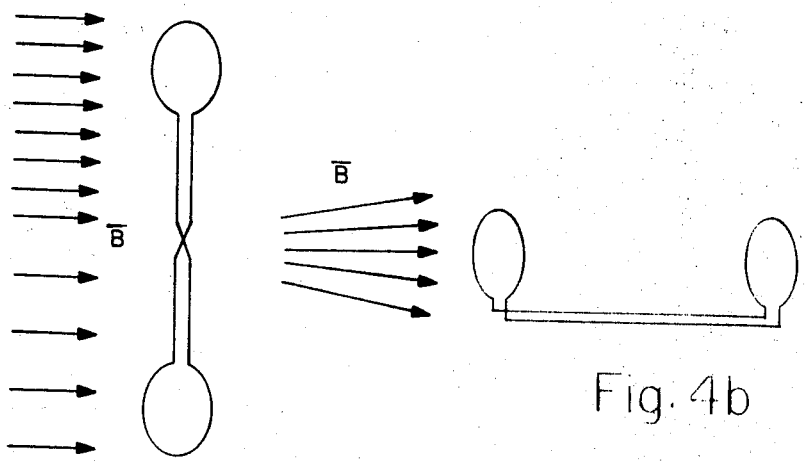
Fig. 4b
Fig. 4a
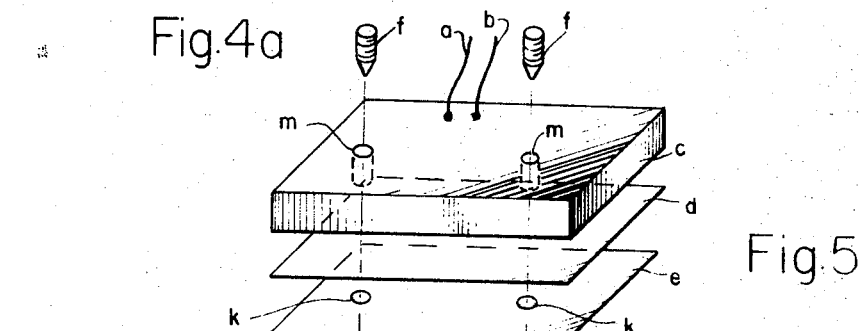
Fig. 5
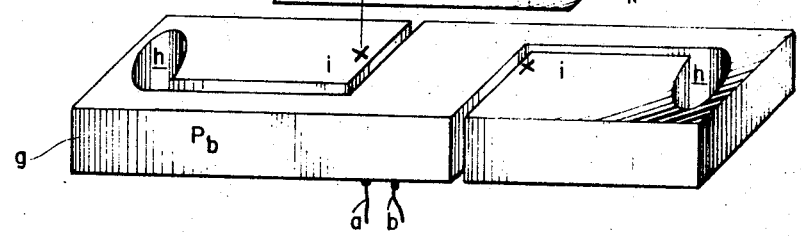
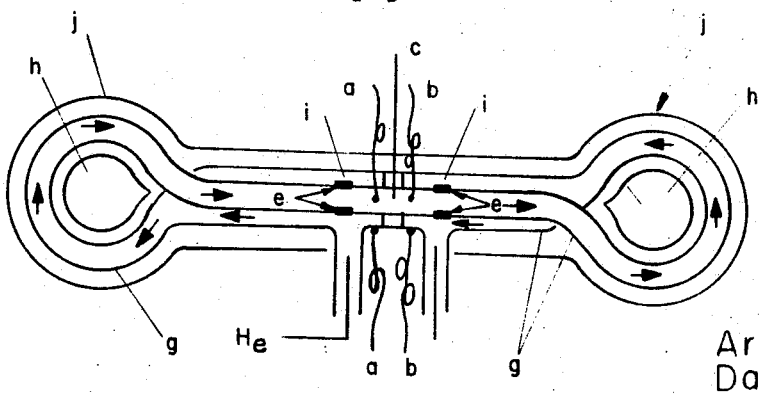
Fig. 7
Arthur L. Morse
Darrell L. Judge
INVENTORS
BY
*Donald C. Keaveney*
ATTORNEY

United States Patent Office 3,528,005
Patented Sept. 8, 1970

3,528,005
ULTRA-SENSITIVE MAGNETIC GRADIOMETER USING WEAKLY COUPLED SUPERCONDUCTORS CONNECTED IN THE MANNER OF A FIGURE EIGHT
Arthur L. Morse and Darrell L. Judge, Los Angeles, Calif., assignors to TRW Inc., Redondo Beach, Calif., a corporation of Ohio
Filed Nov. 16, 1967, Ser. No. 683,586
Int. Cl. G01r 33/02
U.S. Cl. 324—43
6 Claims

ABSTRACT OF THE DISCLOSURE

There is disclosed herein an improved superconducting magnetometer of extreme sensitivity which uses the macroscopic quantum aspects of a superconductor to directly measure the magnetic field, the magnetic gradient, and/or higher order spatial derivatives in magnetic fields. It is known generally that the current flowing between two weakly coupled superconductors at what is commonly called a "Josephson Junction" depends on the discontinuity of the superwave function at the point of the weak link in contrast to non-superconducting material where the current depends on the difference in the voltage across a weak link. The phase of a superwave function is extremely sensitive to an external magnetic field. Circuitry is disclosed herein which is such that the effect of the magnetic field on the phase of the superwave function and the resulting change in current flow across a Josephson Junction can be used as a basis for the operation of a magnetometer in order to measure extremely small changes in magnetic fields.

CROSS REFERENCE TO COPENDING APPLICATIONS

Superconducting magnetometers of somewhat different principles of operation are disclosed in U.S. patent application Ser. No. 417,584 filed Dec. 11, 1964 and entitled, "Superconductive Fluxgate Magnetometer" by George T. Inouye and Darrell L. Judge, now U.S. Pat. 3,435,337 and in U.S. patent application Ser. No. 652,244 filed July 10, 1967 and entitled, "Improved Cryogenic Fluxgate Magnetometer" by Arthur L. Morse, now U.S. Pat. 3,470,461. Both of these patents are assigned to the same assignee as the present application. Both discuss, generally, the related background art and problems in superconducting magnetometers and reference is made thereto solely for such background information.

BACKGROUND OF THE INVENTION

In both deep space and general terrestrial applications there is a continuing need to increase the sensitivity of magnetometers and gradiometers so as to measure smaller and smaller magnetic fields or field gradients. With the development of cryogenic superconductors and techniques for their use, magnetometers of the type described in the above-noted copending applications became possible. The present device further increases the sensitivity attainable.

The general characteristics and properties of superconducting material are well known and have been described not only in the above referenced copending application, but also in an article entitled, "Advances in Superconducting Magnets" by William D. Samson, Paul P. Craig and Myron Strongin, which appeared at pages 114–123 of the March 1967 issue of "Scientific American." A detailed discussion of superconductivity will therefore not be undertaken herein. Similarly, the original work of B. D. Josephson, dealing with the phenomenon arising where "weak links" (which have since become known as "Josephson Junctions") are in a circuit is also discussed in the literature. Reference is made, for example, to an article by B. D. Josephson, entitled, "Possible New Effects in Superconductive Tunneling" which appeared on page 251 of vol. 1 of Physics Letters on July 1, 1962. In that article, Josephson presented an approach to the calculation of tunneling currents between two metals that was sufficiently general to deal with the case where both metals were superconducting. His theoretical predictions of the current flow at such weak links or junctions have since been confirmed by various observers studying the basic phenomena involved. The present invention uses these basic properties of current flow through a Josephson Junction in a superconductor in circuitry for measuring magnetic fields as they affect the current flow through the junction in a superconductor which may either be cryogenic or non-cryogenic.

It is therefore an object of this invention to provide a magnetometer of improved sensitivity.

It is a further object of this invention to provide such a magnetometer which depends for its operation on the effect of the magnetic field to be measured upon the current flow through a weak link in a superconductive circuit.

SUMMARY OF THE INVENTION

As noted, this invention uses the macroscopic quantum aspects of a superconductor to directly measure the gradient and/or higher order derivatives in magnetic fields. The referenced Josephson article shows that current flowing between two weakly coupled superconductors depends upon the discontinuity of the superwave function at the point of a weak link in contrast to nonsuperconducting material where the current depends upon the difference in the voltage across a weak link. The phase of a superwave function is extremely sensitive to magnetic fields and is the effect used in this invention. In a closed superconducting loop of any geometry, the wave function must be single valued. In the absence of a saturable weak link, this condition can be met only if the phase of the wave function changes an integral multiple of $2\pi$ radians as one traverses around a closed path. The rate of change of the phase is determined by the component of the vector potential in the direction of integration such as that around a closed path. The flux threading the loop must be given by a known mathematical relationship from quantum theory, which will be developed below and must be an integral multiple of the flux quantum. If this flux is not present when the loop is made superconducting, the current will flow in such a way as to bring the flux to the nearest integral number of flux quantum.

To utilize this effect to measure field gradients, one must have: first, a method of measuring this current; second, means for switching part or all of the superconductor to and from the normal state at a high enough rate to follow changes in the flux threading the system; and, third, means for keeping track of the number of current maxima occurring from the $$\frac{\Delta B}{\Delta r} = 0 \text{ condition}$$

In connection with the first requirement, it is of particular importance that the supercurrent be made large. This can be accomplished by having the net flux generated by the supercurrent be made very small. This means that the inductance of the superconducting circuit should be minimized. Both the first and second requirements above can be met by providing one or preferably two or more weak links in the superconducting loop which will become normal at their respective maximum Josephson currents causing a voltage to appear across the links which serves as a measure of critical current and which also allows the flux in the loop to readjust to the ambient level. A

BRIEF DESCRIPTION OF THE DRAWINGS

FIGS. 4a–4b are schematic diagrams illustrating the geometry necessary for a gradiometer.

FIG. 5 is an exploded isometric view of the components of a gradiometer sensor.

FIG. 7 is a schematic cross-sectional configuration of a portable gradiometer of high sensitivity including its cryogenic system.

DESCRIPTION OF THE PREFERRED EMBODIMENTS

Figure 1:
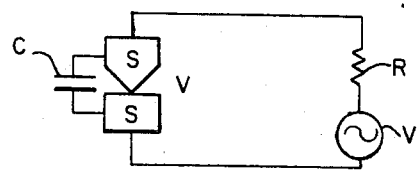
FIG. 1 is a schematic circuit diagram of a single weak link or Josephson Junction which illustrates various basic circuit properties.

In a superconductor the relatively weak interaction between electrons via distortion of the crystal lattice is no longer masked by thermal disorder. The electrons then tend to arrange themselves in a regular lattice in somewhat the same way as a liquid upon solidification. This produces a correlation in electron position and momentum which makes it impossible for one of these electrons to gain or lose less energy than that required to remove it from the electron lattice. Since the energy lost per collision which gives rise to ordinary ohmic resistance is much smaller than this energy gap, resistance vanishes.

With the discovery of flux quantization (see B. S. Deaver and W. M. Fairbanks, "Physics Review Letters," vol. 7, page 43, 1961) and superconducting tunneling (see P. W. Anderson and J. M. Rowell, "Physics Review Letters," vol. 10, page 230, 1963) with its associated very low saturation current, it has been found possible to design and construct magnetometers of much greater sensitivity than previously thought possible. Flux densities as low as $10^{-9}$ gauss have been detected with a cryogenic magnetometer and it is expected that this threshold value may be lowered three or four orders of magnitude in the near future. Such sensitivity permits a determination of magnetic gradients and even higher multipole moments in the earth's field, from which it is possible to determine the nature and source of various anomalies such as those associated with the magnetopause.

Many of the dynamic characteristics of a superconducting circuit are determined by the inductance and capacitance of its components. At low frequencies the inductance is predominant, leading to a relation between the voltage history and the current given by $I = L^{-1} \int V(t)\, dt$, where L is the inductance and $V(t)$ is the voltage imposed across the circuit. If the external flux $\Phi$ through such a loop is changed by an amount $\Delta\Phi$, there will be an induced EMF given by $V(t) = -d\Phi(t)/dt$ so that $\Delta I = -L^{-1}\int d\Phi$ or $\Delta I = -L^{-1}(\Delta\Phi)$, and since the flux associated with a current I through an inductance L is given by $\Delta\Phi = L(\Delta I)$, the total flux will remain constant. It is possible to concentrate essentially all of the induced flux in one part of the circuit. This flux concentration can be made quite large, for example, by forcing all of the circulating current through an extremely short and narrow neck. Since a superconductor becomes normal when the local field exceeds a certain temperature dependent critical value, it is possible to determine when the induced flux causes saturation by observing the inductive voltage kick when the narrow neck becomes normal.

Using only these characteristics of a superconductor, viz, the perfect conductance below a critical current or flux density, it is feasible to construct a magnetometer that would determine the change in flux between successive measurements. The induced current flowing in the superconducting circuit can be determined at any time in one of the following ways. The required critical current can be reduced until saturation is reached by (1) varying the flux concentration near the neck, for example, by closely approaching the narrow neck with a superconducting plane, (2) increasing the temperature of the neck, or (3) imposing a suitable magnetic field parallel to the plane of the superconducting loop. Alternatively, the current can be increased to the critical valve by (4) changing the flux in the loop a known amount, (5) adding an external current through leads attached to each side of the loop or neck, a known fraction of which would add to the current flowing through the narrow neck.

The sensitivity of the above method is determined by the following considerations. First, the circulating current associated with a flux change of 1 gamma—cm.$^2$ or $10^{-5}$ maxwells is about $10^{-5}$ amps in a low inductance ($10^{-8}$ henrys) cm.$^2$ loop. If this current were interrupted in 100 $\mu$sec., there would be a resultant voltage pulse with an amplitude of $10^{-9}$ volts, which would be difficult to detect. Therefore, a less direct approach is required.

If two approximately equal narrow necks, or more generally, "weak links" are used, and an external current is applied so that it flows in parallel through each link, then when one of the links saturates, all of the external current will be forced to flow through the other link and will immediately cause it to saturate. Thereafter, a voltage will appear across the parallel combination determined by the "normal" resistance of the links. This method requires that the external current be greater than half the saturation current of the strongest link, and the signal is a change in the net critical current of the order of $10^{-5}$ amps/gamma of flux change during the time both links are superconducting. It also requires that when the first link reaches saturation, its resistance jumps to and remains at a finite level, that is, its resistance cannot be a function of current only as was first assumed.

With the discovery of flux quantization a number of the above problems were eliminated. If a superconducting ring is formed which contains a nonintegral number of flux quanta, sufficient current will spontaneously flow around the ring to bring the number of flux quanta to the nearest integer. The necessary energy is provided by a decrease in the latent heat of the superconducting phase transition, i.e., the total energy is substantially lower with the electron correlation broken at one or more points with an insulating gap or barrier. This provides a potential which motivates correlated pairs of electrons to cross the barrier if possible, and reform or rejoin the electron lattice on the other side. This process is similar in many respects to that involved in forcing an ice cube through a screen or mesh. Since only correlated electrons which can lose no energy are involved, there can be no DC voltage drop as long as the correlation is maintained and a DC current flows. Similarly, if a DC voltage is maintained, there can be no DC current flow. Electron pairs crossing a barrier with a voltage drop, V, must lose all the energy they gain on the way across in one step as they "condense" or recorrelate on the other side. This leads to the production of a photon of energy $E = hf$ where $E = 2\ eV$, and a frequency of $f = 2\ eV/h$. These effects, associated with weakly coupled superconductors were first predicted theoretically by Josephson 9 (see "Physics Letters," vol. 1, pages 251, 1962) and weak links having these characteristics have become known as Josephson Junctions.

Superconducting circuits involving Josephson Junctions can be adequately described by three very simple equations (Equations 1, 2, and 3 below). The first of these states that the super current through a point junction is proportional to the discontinuity of the superwave function at the junction, and hence to the sine of the phase shift across the junction. The second equation states that the phase shift around any closed path lying within a superconductor must be $2\pi n$ where $n$ is an integer or more simply that the superwave function is single valued, and that the phase shift around a closed loop is proportional to the amount of flux enclosed by the loop. This condition leads immediately to flux quantization when the closed path lies entirely within a superconductor. The third equation states that the phase difference between two superconductors which are not connected is arbitrary but the time rate of change of the phase shift is proportional to the voltage difference between them.

These three equations along with the conventional equations of E&M completely describe superconducting circuits. In the following discussion two superconducting circuits will be analyzed to illustrate the application of these equations.

$$I_j = I_m \sin \phi \quad (1)$$

$$\frac{1}{2\pi}\oint \vec{\nabla}\phi \cdot \vec{dl} = \frac{1}{\Phi_0}\int \vec{B}\cdot \vec{dS} = \Phi/\Phi_0 \quad (2)$$

$$\frac{\partial \theta}{\partial t} = \frac{2eV}{h} = 2\pi \frac{V}{\Phi_0} \quad (3)$$

where:

$I_j$ is the Josephson current
$I_m$ is the maximum current that can flow without loss of correlation
$\phi$ is the phase discontinuity of the superwave function
$\phi_0$ is the flux quantum given by $\phi_0 = h./2e$.

In a geometry and circuit of the type shown in FIG. 1, only Equations 1 and 3 are needed. Here C is the capacitance between the two superconductors, and R the impedance of the voltage source $v$. The current flowing through the junction at time $t$ is given by:

$$I_j = I_m \sin\left(\frac{2e}{h}\int_{-\infty}^{\tau} V dt\right) \quad (4)$$

where $\phi = (2e/h)\int V\,dt$ is a voltage impulse and is analogous to the relation $p = F\,dt$ for momentum. A voltage impulse of one nanovolt-microsecond (i.e., $10^{-15}$ volt-sec.), produces a phase change of 3.04 radians. This response of $3.3 \times 10^{-16}$ volt-sec./radian or $5.74 \times 10^{-18}$ volt-sec./degree is the same for all superconductors.

The voltage, V across the junction, will be given by $$\frac{d(CV)}{dt} = I - I_j$$

$$C\dot{V} = \frac{v-V}{R} - I_m \sin\left(\frac{2e}{h}\int_0^t V dt\right) \quad (4)$$

In terms of the phase across the junction Equation 4 becomes $$\frac{d^2\phi}{dt^2} + \frac{1}{RC}\frac{d\phi}{dt} + \frac{2eI_m}{hC}\sin \phi = \left(\frac{2e}{h}\right)\frac{v(t)}{RC} \quad (5)$$

The nature of the variation of $\phi$, the phase shift across the junction, can be seen by considering the result of a step change in $v$ at $t=0$. For $t<0$, we have $$\phi = \phi_0,\ V = 0,\ I = \frac{v_0}{R}$$

and $$\sin \phi_0 = \frac{I}{I_m}$$

for $t>0$ we have $$\phi = \phi_0 + \delta\phi(t)$$

$$\frac{d^2(\delta\phi)}{dt^2} + \frac{1}{RC}\frac{d(\delta\phi)}{dt} + \frac{2e}{h}\frac{I_m}{C}\left[\sin \theta_0 + \delta\phi(t)\right] = \left(\frac{2e}{h}\right)\frac{v_0 + \delta v}{RC}$$

Since $\delta\phi$ is small, $$\sin(\phi_0 + \delta\phi) = \sin \phi_0 + \delta\phi \cos \phi_0$$

leaving $$\frac{d^2(\delta\phi)}{dt^2} + \frac{1}{RC}\frac{d}{dt}(\delta\phi) + \left(\frac{2eI_m}{hC}\cos\phi_0\right)\delta\phi = \left(\frac{2e}{h}\right)\frac{\delta v}{RC} \quad (6)$$

From Equation 6 is it evident that there will be a resonance of the system at $$f = \frac{1}{2\pi}\sqrt{\frac{2eI_m}{h}\frac{\cos \phi_0}{C}}$$

This is not the "quatum" frequency, however, which is produced when $v/R > I_m$, but simply describes the tendency of the phase to overshoot when adjusting to the value required for the junction to carry the "demand" current.

If the applied voltage contains a high frequency AC component, there will be a nonlinear reactance causing the average DC voltage drop across the junction to be an integral multiple of the Josephson voltage associated with the frequency of the AC component as given by Equation 3 with $$\frac{\delta\phi}{\delta t} = f \text{ and } V = \frac{fh}{2e}$$

FIG. 2 shows several oscilloscope traces obtained with such a system using a frequency of 900 mHz. The vertical deflection is produced by the voltage across the junction while the horizontal deflection indicates the current through the junction.

Figure 2A:
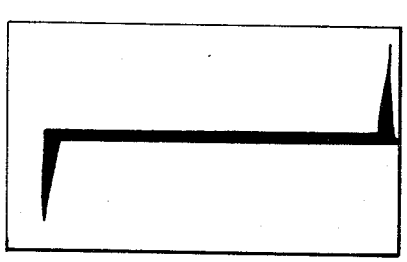
FIGS. 2a, 2b, 2c, and 2d are graphical reproductions of oscilloscope traces obtained of the voltage (vertical) versus current (horizontal) characteristics of a junction of the type shown in FIG. 1, each showing under different circuit operating conditions.
Figure 2B:
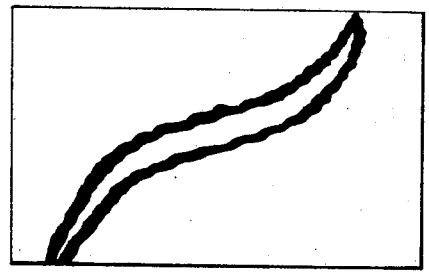
Figure 2C:
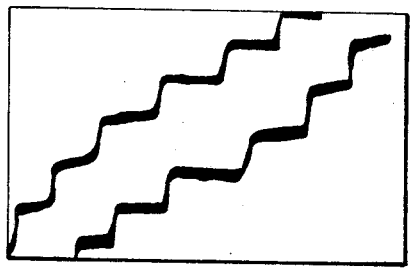
Figure 2D:
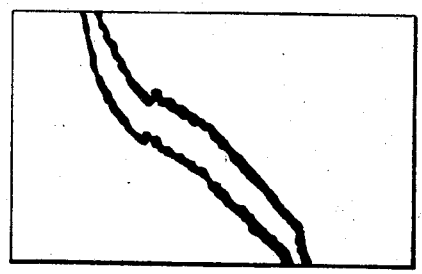

In FIG. 2a the circuit to be described in greater detail below has no R.F. applied, whereas in 2b, 2c, and 2d, R.F. as well as DC power is applied. In FIG. 2c the oscilloscope gain has been increased to more clearly show the step function nature of the response. In FIG. 2a it will be noted that there is no change in V as I increases until a critical value of I is reached at which point V increases as a step function. In all cases, a lead superconductor at a temperature of 4.2° K. was used to form the Josephson Junction.

Figure 3:
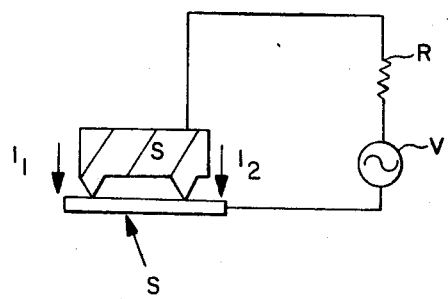
FIG. 3 is a schematic circuit diagram for purposes of illustrative discussion of a circuit having two parallel point junctions of the Josephson type.

In the case of two parallel point contacts as shown in FIG. 3 the analysis is as follows.

Let $\phi_1$ and $\phi_2$ be the phase shifts across junctions 1 and 2, respectively, $I_{1m}$ and $I_{2m}$ their maximum currents, $I_1$ and $I_2$ the instantaneous currents, $$\vec{B}$$

the external magnetic field and $$\vec{A}$$

the area enclosed by the superconducting loop. Further, let the magnetic flux within the loop due to $I_1$ and $I_2$ be given by $L_1 I_1$ and $L_2 I_2$, respectively.

From Equation 2 we have $$\oint \vec{\nabla}\phi\cdot\vec{dl} = 2\pi\left(\frac{\vec{B}\cdot\vec{A}+L_1 I_1 + L_2 I_2}{\Phi_0}\right) = 2\pi n + \phi_1 + \phi_2$$

and from Equation 1

$$2\pi\left(\frac{\vec{B}\cdot\vec{A}+L_1 I_{1m}\sin\phi_1 + L_2 I_{2m}\sin \phi_2}{\Phi_0}\right) = 2\pi n + \phi_1 + \phi_2 \quad (9)$$

If $L_1 I_{1m}/\phi_0$ and $L_2 I_{2m}/\phi_0$ are $\ll 1$ $$\phi_1 + \phi_2 = \frac{B\cdot A}{\phi_0} - 2\pi n$$

and $$I = I_1 + I_2 = I_{1m}\sin\phi_1 + I_{2m}\sin \phi_2$$

and the maximum current is $$I_m\left(I_{1m}^2 + I_{1m}^2 - 2I_{1m}I_{2m}\cos\frac{BA}{\phi^0}\right)^{1/2}$$

This "interference" of the wave function phase at the two junctions results in the parallel combination having a maximum resistanceless current which varies with the magnetic flux and has a period of $\phi_0$. When $(L_1 I_{1m}/\phi_0)$ and $L_2 I_{2m}/\phi_0)$ are $\gg 1$, Equation 9 becomes:

$$L_1 I_{1m} \sin \phi_1 + L_2 I_{2m} \sin \phi_2 = \left(2\pi n - \frac{BA}{\Phi_0}\right) \Phi^0$$

The maximum current that can be carried with both junctions superconducting, assuming that junction two is the first to reach saturation, is given by:

$$I_m = \frac{2\pi n \Phi_0}{L_1} - \frac{BA}{L_1} - \left(\frac{L_2}{L_1} - 1\right) L_{2m} \quad (10)$$

If I is varied at a rapid rate compared to the rate of change of $BA/\phi_0$ this maximum will vary by an amount $$\Delta I_m = (\pi/L_1)\phi_0 \quad (11)$$

with a flux period of $BA = \phi_0$.

Note that in Equation 10 the inductances $L_1$ and $L_2$ will be of opposite sign since currents in opposite sides of the loop will produce fluxes of opposite signs. The mean value of $I_m$ will be given by $$I_m = [1 + (-L_2/L_1)] I_{2m}$$

and the fractional variation is given by:

$$\Delta I_m / I_m = \pi \Phi_0 / (L_1 - L_2) I_{2m}$$

In order to make the variation in $I_m$ easily observable, it is essential that the inductances be made small. This requires the use of conductors of large cross section and counter flowing currents wherever possible. In order to be sensitive to a given component of a field, field gradient, etc., it is possible to construct a circuit of such topology that the total flux threading the closed superconducting loop is proportional to the quantity desired. FIGS. 4a and 4b show the geometry for measuring two of the six components of a field gradient. Similar more complicated arrays could be used to measure any of the higher multipole moments of a magnetic eld. Using two loops of 10 cm. diameter and a base length of 100 cm., one can detect field gradients of the order of $10^{-13}$ gauss/cm. This assumes a 1 percent measurement of the critical current.

Figure 6:
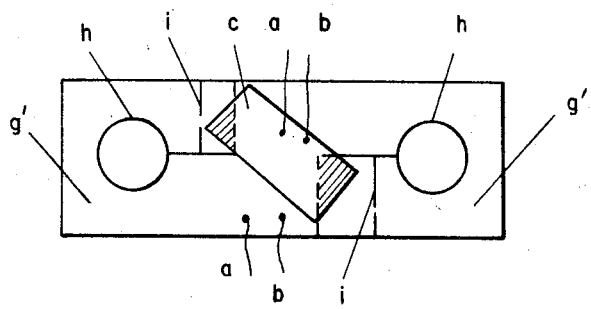
FIG. 6 is a schematic representation of a gradiometer using a thin superconducting film having weak links therein.

FIGS. 5 and 6 show schematic diagrams of the device as used when working with standard laboratory Dewar systems. For space applications, the device would be constructed as in FIG. 7 with liquid helium being continuously pumped through the system. Either mechanical arrangement can be used in the complete system circuitry shown in FIG. 8.

In FIG. 5 there is shown the schematic geometry and structural detail of a typical gradient sensor in accordance with the invention. In FIG. 5, the superconducting circuit is formed in a lead block g having holes h therein for the flux which implement the schematic geometry shown in FIG. 4. Above block g is a thin sheet of insulating material e having a pair of holes k formed in it. Above insulating sheet e is a flexible sheet of lead superconductor d. Finally, above sheet d is a superconducting header c having a pair of threaded holes m which are in alignment with holes k. An adjusting screw f is receivable in each of the holes m.

When the elements shown in exploded relation in FIG. 5 are assembled in contiguous relation and held together by any suitable binding or clamping means (not shown), the pointed end of adjusting screw f forces a portion of flexible superconducting sheet d down through holes k to form a "weak link contact" with block g. Adjusting the pressure which screw f applies to sheet d will, of course, determine the degree of coupling between header c and block g at "weak links" i formed by the portion of sheet d forced through hole k by screw f.

To complete the sensor, a pair of drive voltage leads a are attached to header c and block g, respectively. Also, a pair of voltage measuring leads b are similarly attached to header c and block g. In the complete schematic circuit diagram of FIG. 8, drive leads a and sensing leads b are shown connected externally of the sensor rather than at its surfaces. The two arrangements are, of course, electrically equivalent.

In FIG. 6 there is shown a schematic representation of a gradiometer wherein a thin superconducting film g' (which may be mounted on an insulating substrate such as a glass plate) is used in place of block g. All other elements are the same and are indicated by the same reference characters.

In FIG. 7 there is shown a schematic configuration for a gradiometer of high sensitivity which is suitable for portable applications, as in a space vehicle. It will, of course, be understood that any of the sensors previously discussed can be operated at the necessary cryogenic temperatures by simple immersion in any conventional cooling bath such as a Dewar flask of liquid helium. Where it is desired to conveniently transport the gradiometer, a cooling system such as shown in FIG. 7 in longitudinal cross section may be used.

Figure 8:
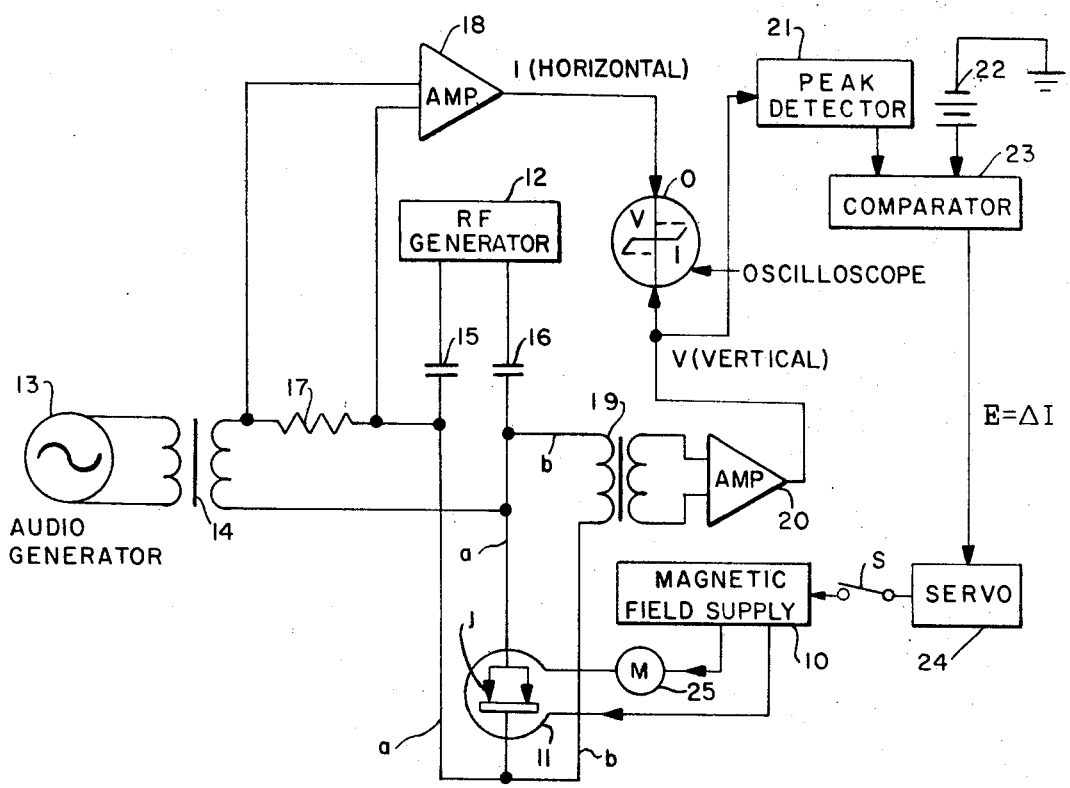
FIG. 8 is a complete circuit diagram of a magnetometer in accordance with the present invention.

It will be noted that the system comprises vacuum insulated tubing formed by concentric inner and outer tubes which are preferably of stainless steel. The concentric tubing is arranged in a generally T shaped configuration with a loop j at each end of the T. The hole within the loop j forms the hole h for the flux as discussed in previous configurations. It will be noted from the flow arrows that liquid helium, He, is supplied through the stem of the T shaped configuration, is circulated to and around the inner tube of the lefthand loop which then re-enters the cross member of the T in heat exchange relationship with the input line. The flow continues across the T to the righthand loop through which it circulates before again re-entering to flow back to and out of the central stem of the T. Such a system is designed for a continuous flow of helium from any convenient supply through its vacuum insulated tubing. Lengths of several meters or more are quite feasible. The superconducting circuit consists of a lead coating on the outer surface of the inner tubing. The weak links may be of either of the types discussed above. Of course, the necessary electronic equipment as shown in FIG. 8 is mounted externally of the cooling jacket for the sensor and is connected thereto by leads a and b as discussed above.

In laboratory or other stationary arrangements magnetic shielding may be afforded, for example, by a lead tube having a diameter of 3 inches and a length of 7 inches. The wall thickness of the tube is about $1/16$ inch. The ends of the tube are about 90 percent closed, small openings being required for the passage of liquid He throughout the volume enclosed by the lead, as well as for the passage of mechanical apparatus and electrical leads. This shielding system just described is by no means cited as an example of the best one can do. One can, of course, imagine a number of variations on this technique.

A pump-like arrangement, that is, a cylinder and piston, is another way to achieve the same result. In any case, whatever method may be selected is virtually guaranteed to be far superior to the presently popular technique of using mu-metal or by trade name, netic and co-netic foil. Typically, a well designed mu-metal shield provides a shielding factor of no more than 50 to 100 at the very best. This is to be compared with the lead tube discussed earlier having a shielding factor of $10^5$. Of course the price one must pay is that of working with a shield at liquid He temperatures.

However, research now underway on practical ways to build high temperature superconductors provides encouragement that in the not far distant future the use of superconductors will not be restricted to cryogenic temperatures. Even without such advances, regenerative Dewar systems and new thermal insulators make it presently feasible to transport cryogenic measuring instruments.

The operation of the gradient sensor system shown in FIGS. 5, 6 and 7 is as follows.

A sinusoidal voltage is applied through leads (a) causing current to flow through the superconducting header (c), through the two weak links (i), and via the superconducting circuit (g) around the holes (h).

When the supercurrent through either of the weak links (i) exceeds the saturation value, a voltage is developed between (c) and (g) which is sensed with the voltage leads (b). If the net flux through the two holes (h) is zero, the current at which (i) saturates will be maximum and equal to twice the saturation current of either weak link. If the two fluxes are slightly different an initial circulating current will be present which will add to the drive current at one weak link and subtract at the other, causing a voltage to appear at (b) for a smaller drive current. The useful signal then arises from the voltage which appears when the drive current exceeds the maximum Josephson current for either junction. To determine the critical drive current it is necessary to know only the drive current function and the time, relative to a fixed reference, at which a voltage appears across the junction. For example, for a sinusoidal drive current, the current increases from $t=0$ to $t=\tau/4$ and there is a unique relation between the current required to produce saturation (maximum Josephson current), the time at which it occurs and the appearance of a voltage across the junctions. The system can thus be calibrated in terms of $\Delta B$, the difference between the fields seen by the two holes (h) versus the time in the current cycle at which a voltage appears across the voltage leads (b).

The magnitude of this voltage across the junctions will vary as a function of its above noted time occurrence. If a controllable bucking field is established by a suitable coil to modify the unknown external field to be measured so as to hold the modified resulting gradient at a fixed value, then both the time and magnitude of the measured voltage across the junction will be held constant. Hence, comparison of this voltage with a standard reference can be used to generate an error signal to be applied to a nulling servosystem which controls the current being supplied to the coil generating the bucking field. When this is done an ammeter 17 which reads this current can be linearly calibrated to indicate the magnitude of the external field gradient being bucked out by the field of the coil.

FIG. 8 shows a detailed circuit diagram of such an apparatus. With switch S open the characteristics discussed above can be read directly on oscilloscope O assuming manual control of magnetic field supply 10 as a bias only. With switch S closed the system operates in the servo mode and measurement is read directly from meter M.

Turning now to the schematic circuit diagram of FIG. 8, the Josephson Junction is indicated generally by the reference character, J. It will be understood that the junction assembly can be of any of the varieties discussed above. Surrounding the Josephson Junction sensor, J, is a magnetic field generating coil 11 which has current supplied to it from the magnetic field supply 10. The coil 11 is of FIG. 8 configuration with one loop surrounding each of the holes h so that its field adds to the external field in one of the holes and subtracts from the field in the other hole to thereby cancel or buck out the gradient. Of course, if it were desired to measure the magnetic field itself rather than the gradient of the field, a different circuit topology suited to such an arrangement could be used.

A radio frequency power generator 12 and an audio frequency power generator 13 are connected by leads a to apply a drive voltage to the sensor in the manner discussed above. Audio generator 13 is connected into the circuit through a transformer 14, whereas an R-F generator 12 is connected into the circuit through coupling capacitors 15 and 16. A resistor 17 is connected in the output circuit of transformer 14 and the voltage drop across resistor 17 is connected as an input to amplifier 18 which in turn has its output connected to provide the horizontal drive signal for the oscilloscope O. The voltage drop across resistor 17 affords a measure of the current flowing in the super-conducting circuit of the sensor J.

Output from the sensor J is taken through conductors or leads b, as described in connection with the detailed views of each of the sensors. Leads b are connected to the input of a transformer 19, which has its output connected to an amplifier 20, which, in turn, has its output connected to drive the vertical displacement of the oscilloscope O. The vertical deflection of the oscilloscope will thus afford a measure of the voltage apearing across the Josephson Junctions.

The output of amplifier 20 is also connected to a peak voltage detector 21. This peak voltage detector circuit 21 may be any conventional circuit for providing a constant DC output which is equal to the maximum instantaneous value of the AC input to the circuit. A standard voltage source or battery 22 is connected to a comparator circuit 23, as is the output of the peak detector 21. The comparator circuit compares the output of peak detector 21 with the value of the peak voltage source 22 and provides an output error signal, which is equal to their difference, so that when the two inputs to the comparator circuit are equal, the output will be zero. This error signal output from comparator 23 is applied to a suitable conventional servo system 24, which may be connected by closing switch S to control the magnitude of the current delivered to the coil 11 by the magnetic field supply 10. The field supply 10 and servo system 24 are, of course, so connected that the error signal is polarized to drive the magnetic field supply in a direction such as to reduce the error signal and, ultimately, to null it to zero. As has been explained above, in this state the fields being generated by coil 11 will be such as to cancel the gradient being measured. Hence, by measuring the magnitude of the field gradient generated by coil 11, one obtains a measure of the field gradient to be measured. The meter 25 is an ammeter connected in the output circuit from the magnetic field supply 10, and by means of using the apparatus to measure known small fields, it can be calibrated to read directly the strength of the field component being measured.

While specific preferred embodiments of the invention have been described by way of illustration only, it will be understood that the invention is capable of many other specific embodiments and modifications and that it is defined solely by the following claims.

What is claimed is:
1. A magnetic gradiometer, comprising:
    a cryogenic medium;
    two spaced apart superconductive loops lying in parallel planes and exposed to said cryogenic medium, one end of each loop connected in series with each other;
    means forming two weak link junctions connecting the other ends of said superconductive loops to form a closed superconductive circuit;
    the areas encompassed by said superconductive loops being equal;
    said superconductive loops being connected in said closed superconductive circuit in the manner of a figure eight such that, in the absence of drive current, any circulating current will flow in opposite sense through said superconductive loops;
    means arranged to supply drive current to said superconductive circuit so that it flows through said weak link junctions in parallel and with a magnitude exceeding the saturation value of one of said weak link junctions;

and means for sensing the voltage across said weak link junctions as a measure of the magnetic field gradient to which the device is exposed.

2. The invention according to claim 1, wherein said weak link junctions and said drive current means are arranged in said closed superconductive circuit in such a way that drive current flowing through said weak link junctions traverses two paths of equal inductance.

3. The invention according to claim 1, wherein said closed superconductive circuit forms low electrical inductance.

4. The invention according to claim 1, and further including means for comparing the voltage sensed across said weak link junctions with a reference voltage to derive an error signal;

magnetic field generating means positioned to apply a magentic field to said superconductive circuit null the ambient magnetic field property to be measured; and servo control means actuated by said error signal to control the magnetic field generated by said magnetic field generating means so that the magnetic field so applied is a measure of the ambient magnetic field property when said error signal is zero.

5. The invention according to claim 1, wherein said superconductive loops are coplanar.

6. The invention according to claim 1, wherein said superconductive loops comprise tubular superconductors; and a source for supplying liquid helium through said tubular superconductors.

References Cited

UNITED STATES PATENTS

| | | | |
|---|---|---|---|
| 2,663,843 | 12/1953 | Wickerham et al. | 324—43 |
| 2,836,791 | 5/1958 | Kaplan | 324—43 |
| 2,975,360 | 3/1961 | Bell | 324—43 |
| 3,335,363 | 8/1967 | Anderson et al. | 324—43 |
| 3,363,200 | 1/1968 | Jaklevic et al. | 307—306 |
| 3,445,760 | 5/1969 | Zimmerman | 324—43 |

RUDOLPH V. ROLINEC, Primary Examiner

R. J. CORCORAN, Assistant Examiner